(12) United States Patent
Okude et al.

(10) Patent No.: US 8,244,451 B2
(45) Date of Patent: Aug. 14, 2012

(54) TRAFFIC INFORMATION PROVIDING SYSTEM, APPARATUS, METHOD, AND IN-VEHICLE INFORMATION APPARATUS

(75) Inventors: Mariko Okude, Hitachi (JP); Masatoshi Kumagai, Sendai (JP); Tomoaki Hiruta, Hitachi (JP); Shinichi Amaya, Higashiyamato (JP); Noriyuki Abe, Yokohama (JP); Yoshinori Endo, Mito (JP)

(73) Assignee: Xanavi Informatics Corporation, Zama-shi (JP)

( * ) Notice: Subject to any disclaimer, the term of this patent is extended or adjusted under 35 U.S.C. 154(b) by 847 days.

(21) Appl. No.: 12/179,404

(22) Filed: Jul. 24, 2008

(65) Prior Publication Data

US 2009/0030596 A1 Jan. 29, 2009

(30) Foreign Application Priority Data

Jul. 25, 2007 (JP) ................. 2007-193432

(51) Int. Cl.
G06G 7/76 (2006.01)
(52) U.S. Cl. ....................................... 701/117
(58) Field of Classification Search ............ 701/117, 701/24, 25, 26, 118, 119; 340/933, 934, 340/936, 988–993
See application file for complete search history.

(56) References Cited

U.S. PATENT DOCUMENTS

| 6,249,740 | B1 | 6/2001 | Ito et al. | |
| 6,427,117 | B1 * | 7/2002 | Ito et al. | 701/209 |
| 6,931,320 | B2 | 8/2005 | Mori et al. | |
| 7,536,254 | B2 | 5/2009 | Kumagai et al. | |
| 2006/0206256 | A1 | 9/2006 | Kumagai et al. | |
| 2006/0274666 | A1 * | 12/2006 | Kim et al. | 370/252 |

FOREIGN PATENT DOCUMENTS

| EP | 1 324 007 A2 | 7/2003 |
| JP | 2003-194557 | 7/2003 |
| JP | 2006-84257 A | 3/2006 |
| JP | 2006-184772 | 7/2006 |
| JP | 2006-251941 | 9/2006 |
| JP | 2007-114128 | 5/2007 |

OTHER PUBLICATIONS

Corresponding European Search Report dated Nov. 16, 2010 (Seven (7) pages).
Japanese Office Action dated Oct. 20, 2009 with translation—6 pages, JP2007-193432.

* cited by examiner

*Primary Examiner* — Mark Beauchaine

(74) *Attorney, Agent, or Firm* — Crowell & Moring LLP

(57) ABSTRACT

When receiving a traffic information providing request, a traffic information providing apparatus analyzes which area's traffic information is requested based on the received request information. Traffic information of road links located in the requested area is read from the traffic information, and it is determined whether the road links' traffic information is similar or not. Similar links configure a link group, and traffic information corresponding to the link group is created. Traffic information of the configured link group is delivered to an in-vehicle information apparatus.

16 Claims, 12 Drawing Sheets

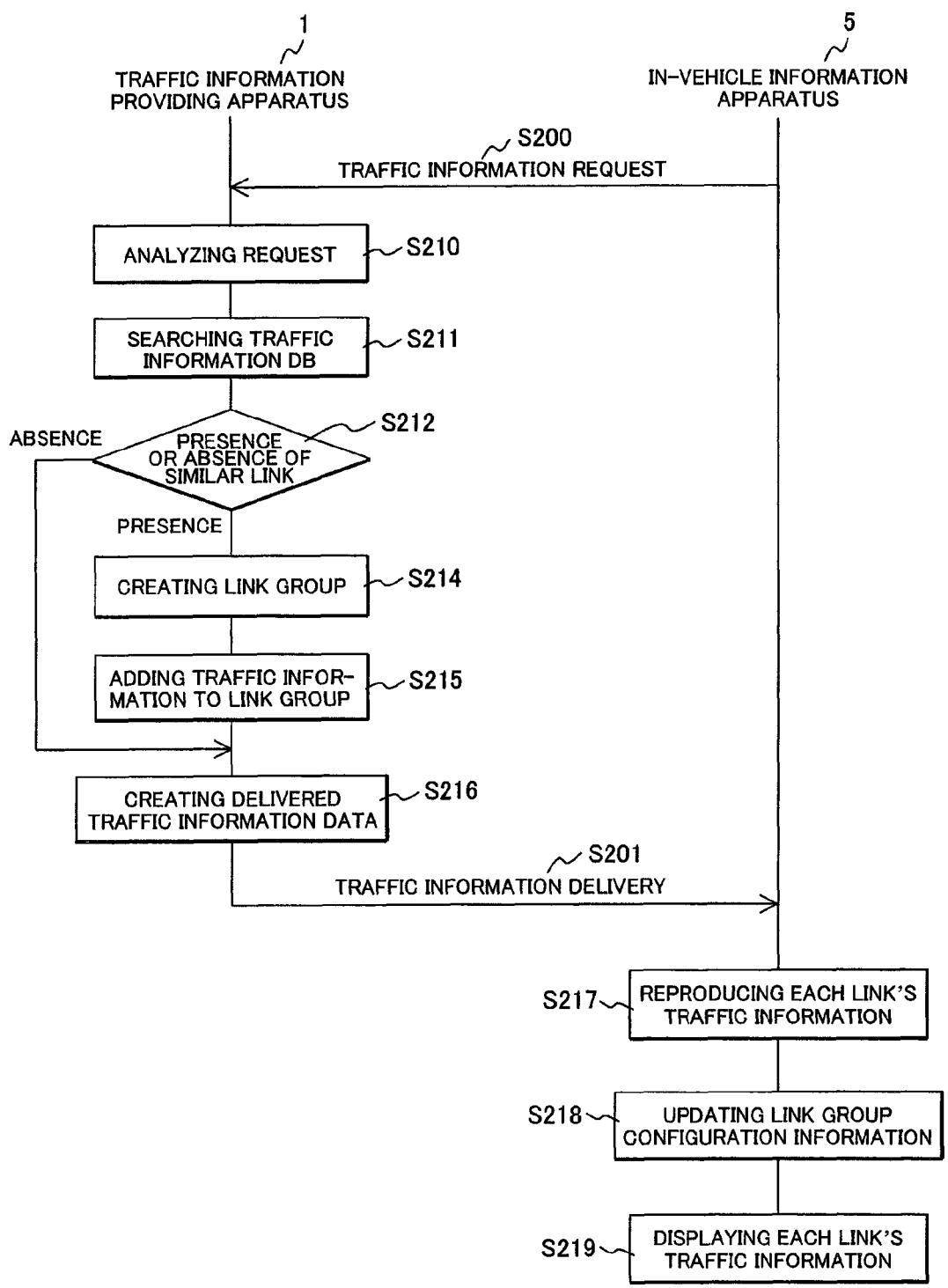

FIG. 3

| 300 |
|---|
| AREA CODE (310) |
| PROVISION TIME (320) |
| NUMBER OF LINK GROUPS (330) |

LINK GROUP 1 (340):
| | |
|---|---|
| LINK GROUP IDENTIFICATION ID (341) | |
| NUMBER OF LINK (342) | |
| SPEED OR TRAVEL TIME/ DEGREE OF TRAFFIC JAM (343) | |
| ROAD LINK (344) | L1 |
| | L2 |
| | L4 |
| | L100 |
| | L101 |

LINK GROUP 2:
| | |
|---|---|
| LINK GROUP IDENTIFICATION ID | |
| NUMBER OF LINKS | |
| SPEED OR TRAVEL TIME/ DEGREE OF TRAFFIC JAM | |
| LINK | L3 |
| | L205 |
| | L206 |

LINK GROUP:
| | |
|---|---|
| LINK GROUP IDENTIFICATION ID | |
| NUMBER OF LINKS | |
| SPEED OR TRAVEL TIME/ DEGREE OF TRAFFIC JAM | |
| LINK | ... |

DELIVERY MODE 1 — 701

| | | |
|---|---|---|
| AREA INFORMATION | | 310 |
| PROVISION TIME | | 320 |
| DELIVERY MODE 1 | | 710 |
| NUMBER OF LINK GROUPS | | 330 |
| LINK GROUP | LINK GROUP ID | 341 |
| | SPEED OR TRAVEL TIME/ DEGREE OF TRAFFIC JAM | 343 |
| LINK GROUP | ... | |
| . . | ... | |

FIG. 7B

DELIVERY MODE 2 — 702

| | | |
|---|---|---|
| AREA INFORMATION | | 310 |
| PROVISION TIME | | 320 |
| DELIVERY MODE 2 | | 720 |
| NUMBER OF LINK GROUPS | | 330 |
| LINK GROUP | LINK GROUP ID | 341 |
| | NUMBER OF LINKS | 342 |
| | SPEED OR TRAVEL TIME/ DEGREE OF TRAFFIC JAM | 343 |
| | LINK | 344 |
| LINK GROUP | ... | |
| . . | ... | |

FIG. 9

| 900 |
|---|
| 533924 (310) |
| 2006/01/28 (320) |
| DELIVERY MODE 1 (910) |
| 2 (330) |

| LINK GROUP | 1 (341) |
|---|---|
|  | v1 (342) |

| LINK GROUP | 2 (341) |
|---|---|
|  | v2 (342) |

| 533924 (310) |
|---|
| 2006/01/28 (320) |
| DELIVERY MODE 3 (910) |
| 1 (330) |

| LINK | L2 (341) |
|---|---|
|  | v3 (342) |

FIG. 10

| AREA CODE (110) | | | |
|---|---|---|---|
| LINK GROUP 1 | LINK GROUP ID (120) | | |
| | NUMBER OF LINKS (130) | | |
| | ROAD LINK | L1 | |
| | | L2 | |
| | | L4 | |
| | | L100 | |
| | | L101 | |
| LINK GROUP 2 | LINK GROUP ID | | |
| | NUMBER OF LINKS | | |
| | LINK | L3 | |
| | | L205 | |
| | | L206 | |
| .. | ... | | |
| AREA CODE | | | |
| .. | ... | | |

(100)

TRAFFIC INFORMATION PROVIDING SYSTEM, APPARATUS, METHOD, AND IN-VEHICLE INFORMATION APPARATUS

CLAIM OF PRIORITY

The present application claims priority from Japanese patent application serial No. 2007-193432, filed on Jul. 25, 2007, the content of which is hereby incorporated by reference into this application.

FIELD OF THE INVENTION

The present invention relates to a traffic information providing system, apparatus and a method for providing current traffic information and predicted traffic information, and also relates to an in-vehicle information apparatus for receiving traffic information and providing the information to a driver or executing a car navigation operation.

BACKGROUND OF THE INVENTION

Conventionally, in Japan, there is a system for providing traffic information about road traffic situations to vehicles, which is called VICS (Vehicle Information and Communication System) run by Vehicle Information and Communication System Center (hereafter, referred to as VICS (registered trademark) center). The VICS gathers information in real time sent from road sensors (ultrasonic sensors, loop coil sensors, AVI, optical beacon units, etc.) managed by prefectural polices and road managers, collects the traffic information, such as traffic jam and travel time information, in one centralized location, and provides the information to drivers. The traffic information update period normally takes five minutes since it depends on the collection period of measured information received from road sensors, and it is possible to provide information all the time as long as road sensors operate properly. As information providing means, narrow-area communication that uses beacon units (optical, radio wave) and wide-area communication by FM multiplex broadcasting are popular. Drivers who use car navigation apparatus can acquire real-time traffic information provided by the VICS, select a route that avoids a traffic jam, and estimate arrival time required to the destination.

Since the road link of which traffic information can be provided by the VICS depends on the presence or absence of road sensors, traffic information that can be provided is limited to predetermined links. Hereafter, this link is referred to as a VICS link. The number of VICS links is increasing year by year due to new installation of road sensors, and development of probe technology for traffic situations enables traffic information about links other than VICS links to be collected and provided. That is, the amount of traffic information delivered from the traffic information providing center to car navigation apparatuses is expected to continuously increase. Accordingly, from now on, it is required to reduce the amount of information delivered from the traffic information providing center to in-vehicle information apparatuses.

Incidentally, in Japanese Patent Laid-open No. 2006-84257, a technology that uses difference delivery has been disclosed as a method for reducing the amount of traffic information delivered from the traffic information delivery center to in-vehicle information apparatuses typified by car navigation apparatuses. In the difference delivery procedure, when traffic information is delivered, only traffic information (difference information) which is different from the previously delivered traffic information is delivered, thereby making it possible to reduce the amount of information to be delivered.

SUMMARY OF THE INVENTION

Generally, traffic information difference delivery technology uses temporal redundancy of traffic information of the same link. However, the amount of information to be delivered is still large and further reduction is required.

It is an objective of the present invention to provide a traffic information providing system which can reduce the amount of information to be delivered when delivering traffic information to in-vehicle information apparatuses such as car navigation apparatuses.

It is another objective of the present invention to provide a traffic information providing apparatus or method which can reduce the amount of information to be delivered.

It is still another objective of the present invention to provide an in-vehicle information apparatus which can reduce the amount of information to be delivered.

In an actual traffic flow, there are cases in which the average travel speed along the road link that approaches a certain intersection and the average travel speed along the road link that departs is the same, and traffic situations of different links are similar in many cases depending on the geographical relation of the road links and road circumstances (road category, road width, etc.). It is possible to reduce the amount of information to be delivered by considering the similarity of traffic information among different road links.

According to one aspect of the present invention, the road traffic information delivery process, wherein collected road traffic information is delivered to a communication network and the delivered road traffic information is received by an in-vehicle information apparatus installed in automobiles, is characterized in that a plurality of similar road links are gathered and formed into a link group, and its link group ID (Identification) and the traffic information corresponding to the link group are delivered via the communication network.

According to a preferred embodiment of the present invention, the similarity of traffic situations of a plurality of road links is determined, and road links which have been determined to be similar are formed into a link group, traffic information corresponding to the link group is created, and traffic information is delivered for each link group.

According to a specific embodiment of the present invention, a traffic information providing apparatus determines the similarity of traffic information of road links included in each prescribed area of map meshed, and configures a link group of road links that have been determined to be similar. Then, the traffic information providing apparatus creates traffic information corresponding to the configured link group and provides the traffic information of each link group to in-vehicle information apparatuses.

When an in-vehicle information apparatus does not have link group configuration information which configures the link group, it requests the delivery of traffic information in which a road link list of the link group is added to the link group's traffic information. When an in-vehicle information apparatus has link group configuration information which configures the link group, it requests the delivery of traffic information which corresponds to the identification (ID) code that identifies the link group. It is desirable that the delivery mode be specified for each area by an in-vehicle information apparatus.

Therefore, it is desirable that an in-vehicle information apparatus comprise a means for acquiring traffic information of a link group and a means for reproducing traffic information about each road link from the link group's traffic information.

ADVANTAGES OF THE INVENTION

In conventional delivery methods wherein traffic information is added to each road link and delivered, it is necessary to deliver the same number of traffic information units as the number of links.

In contrast, according to the preferred embodiments of the present invention, similar links are formed into a link group and traffic information is added to each link group and delivered. Therefore, only the same number of traffic information units as the number of link groups need be delivered. As a result, according to the total number of link groups<the total number of links (similar links definitely exist), it is possible to reduce the amount of delivered information.

Other objectives and characteristics of the present invention will be clearly described in the embodiments described below.

BRIEF DESCRIPTION OF THE DRAWINGS

FIG. 2 is a flowchart showing the process of delivering traffic information by a traffic information providing apparatus and an in-vehicle information apparatus according to embodiment 1 of the present invention.

FIG. 3 shows an example of delivered traffic information data according to embodiment 1 of the present invention.

FIG. 7 shows delivered traffic information data according to embodiment 2 of the present invention.

FIG. 9 is an example showing the configuration of delivered traffic information data combined with delivery modes according to embodiment 2 of the present invention.

FIG. 10 relates to FIG. 9 and shows an example of link group configuration information which shows the configuration of the link group set for the delivered traffic information data.

DETAILED DESCRIPTION OF THE PREFERRED EMBODIMENTS

Embodiments of a traffic information providing apparatus and an in-vehicle information apparatus according to the present invention will be described with reference to the drawings.

Embodiment 1

Figure 1:
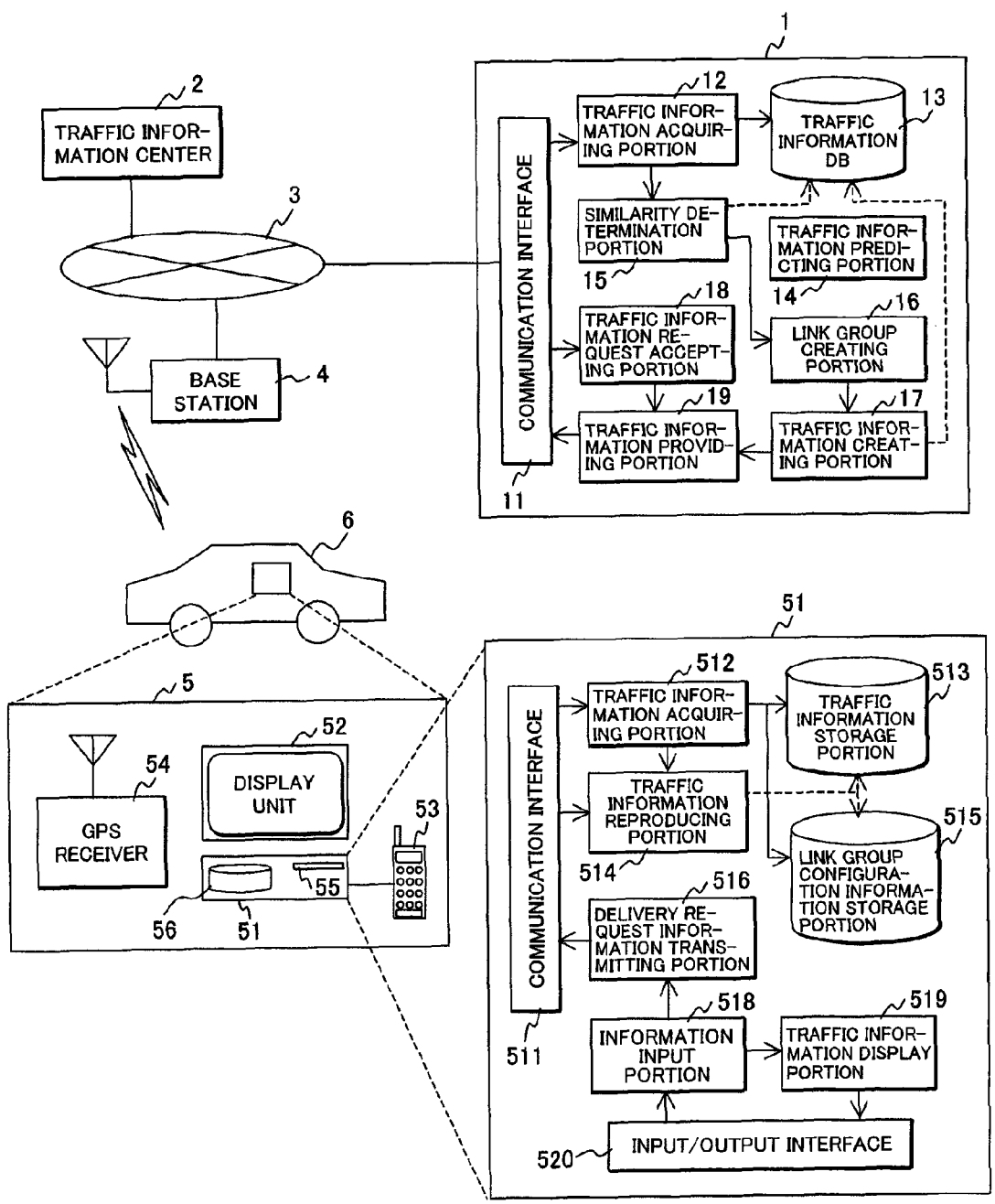
FIG. 1 shows the entire configuration of a traffic information providing system according to embodiment 1 of the present invention and is also a functional block diagram of a traffic information providing apparatus and an in-vehicle information apparatus.

FIG. 1 shows the entire configuration of a traffic information providing system according to embodiment 1 of the present invention and is also a functional block diagram of a traffic information providing apparatus and an in-vehicle information apparatus. As shown in the drawing, the traffic information providing system comprises a traffic information providing apparatus 1, a traffic information center 2, a communication network 3 including the Internet and public line networks, a base station 4 for cellular phone, and an in-vehicle information apparatus 5 installed in a vehicle 6. In some cases, instead of providing a communication network 3, the in-vehicle information apparatus 5 acquires traffic information via broad casting or narrow-area communication that uses beacon units and wide-area communication by FM multiplex broadcasting.

Herein, the traffic information center 2, which is, for example, the VICS's center computer, collects information acquired by road sensors installed on the roads and provides the information in real time to the traffic information providing apparatus 1. The traffic information providing apparatus 1 receives and stores traffic information provided by the traffic information center 2 and, according to a request made by the in-vehicle information apparatus 5, the traffic information providing apparatus 1 properly processes the accumulated traffic information and delivers the information to the in-vehicle information apparatus 5.

Herein, traffic information basically includes link travel time, travel speed, degree of traffic jam and length of traffic jam along each road link. In addition, it is desirable that the traffic information include information about the presence or absence of traffic control, construction, accidents and disasters along each link, vacancy information of parking areas and facilities, and operation information (in operation, out of service, closed, etc.) of tollbooths, service areas and other facilities. Furthermore, the information category includes current traffic information and predicted traffic information.

Hereafter, by referring to FIG. 1, configurations and functions of a traffic information providing apparatus 1 and an in-vehicle information apparatus 5 will be described in detail.

The traffic information providing apparatus 1 is configured by a computer having a communication apparatus (not shown) connected to a communication network 3. The computer comprises a communication interface 11, a traffic information acquiring portion 12, and a traffic information database (hereafter, referred to as traffic information DB) 13. And, the computer includes functional blocks such as a traffic information predicting portion 14, a similarity determination portion 15, a link group creating portion 16, a traffic information creating portion 17, a traffic information request accepting portion 18, and a traffic information providing portion 19.

Moreover, the computer which configures the traffic information providing apparatus 1 has at least a storage apparatus (such as semiconductor memory and a hard disk unit) and a central processing unit. And, the function of each functional block 11-19 that configures the above-mentioned traffic information providing apparatus 1 is activated by the central processing unit executing a prescribed program stored in the storage apparatus.

The communication interface 11 executes communication control of the communication network 3 and sends and receives data to and from the traffic information center 2 or an in-vehicle information apparatus 5 via the communication network 3. The traffic information acquiring portion 12 acquires, via the communication interface 11, current traffic information provided by the traffic information center 2 at each prescribed time period or every time traffic information is updated and stores the acquired current traffic information in the traffic information DB 13 by adding corresponding time and date information to the traffic information. Herein, with respect to the acquisition of traffic information, there is also a method by which traffic information, such as travel time or travel speed of each link, is calculated based on the travel data acquired by a probe car and stored in the traffic information DB 13 along with data acquired from the traffic information center 2.

The traffic information DB 13 stores current information with date information included and also stores statistical traffic information for each time slot of each day factor of week which has been obtained as the result of current traffic information being statistically processed by a statistical traffic information creating portion, not shown. Furthermore, based on the current traffic information acquired by a traffic information acquiring portion 12 and statistical traffic information stored in the traffic information DB, the traffic information predicting portion 14 predicts future traffic information and stores the predicted traffic information in the traffic information DB 13.

The traffic information request accepting portion 15 receives delivery request information sent by an in-vehicle information apparatus 5. The delivery request information is information sent by an in-vehicle information apparatus 5 to the traffic information providing apparatus 1 so as to make a request of the delivery of traffic information. The delivery request information includes a mesh (, cell, or parcel) code for specifying an area, information for specifying a traffic information category (current traffic information, predicted traffic information, etc.), and in the case of the predicted traffic information, information of time to predict is included if necessary.

With regard to the traffic information stored in the traffic information DB, the similarity determination portion 15 compares link travel time, travel speed, or traffic jam information of each road link and determines whether those values are similar or not. The link group creating portion 16 configures a link group of similar links. The link group is managed by using link group configuration information, such as a road link list 344, described later in this document with reference to FIG. 3.

The traffic information creating portion 17 reads current or predicted traffic information stored in the traffic information DB 13 and assigns traffic information to each link group created by the link group creating portion 16.

Based on the request conditions analyzed by the traffic information request accepting portion 18, the traffic information providing portion 19 converts traffic information of the link groups created by the traffic information creating portion 17 into a delivered data format and provides the current or predicted traffic information to an in-vehicle information apparatus 5 via the communication interface 11.

On the other hand, an in-vehicle information apparatus 5 installed in a vehicle 6 comprises a main body 51, a display unit 52, a cellular phone 53, and a GPS (Global Positioning System) receiver 54.

The main body 51 is a computer which comprises an central processing unit (not shown), a storage apparatus 56, and a portable storage media connecting adapter 55. Herein, the storage apparatus 56 comprises a semiconductor memory and a hard disk unit. Furthermore, the portable storage media connecting adapter 55 comprises a drive unit for a DVD (Digital Versatile Disk) and USB (Universal Serial Bus) flash drive. Furthermore, the main body 51 can also include switches, buttons, a touch-panel, a remote-controller, and a microphone as input devices and a speaker as an output device.

The display unit 52 is configured by an LCD (Liquid Crystal Display) to display map information and traffic information outputted by the main body 51. Furthermore, a cellular phone 53 conducts wireless communication with a base station 4 so that the in-vehicle information apparatus 5 can execute data communication with the traffic information providing apparatus 1 via the base station 4 and a communication network 3. In this embodiment, a configuration that uses a communication means is shown; however, broadcasting or narrow-area communication that uses beacon units and wide-area communication by FM multiplex broadcasting can be used as a traffic information receiving means; and also a wireless communication network such as WiFi (registered trademark) can be used. The GPS receiving apparatus 54 receives radio waves from a GPS satellite, not shown, and detects the current position of a vehicle 6. Instead of using a GPS receiving apparatus 54, it is possible to use position information acquired by a cellular phone 53.

Furthermore, the main body 51 includes the following functional blocks: a communication interface 511, a traffic information acquiring portion 512, a traffic information storage portion 513, a traffic information reproducing portion 514, a link group configuration information storage portion 515, a delivery request information transmitting portion 516, an information input portion 518, a traffic information display portion 519 and an input/output interface 520. Those functional blocks of the main body 51 can be activated by an central processing unit, not shown, executing a prescribed program stored in the storage apparatus 56.

The communication interface 511 executes communication control of a cellular phone 53 and also sends and receives data to and from the traffic information providing apparatus 1 via a base station 4 and a communication network 3. The input/output interface 520 inputs information sent from a GPS receiver 54 and inputted by using switches and buttons and displays a map and traffic information on the display unit 52. It is possible to acquire information by using an audio input/output and provide the information.

The traffic information acquiring portion 512 receives traffic information of each link group provided by the traffic information providing apparatus 1 and the traffic information storage portion 513 stores traffic information with date information included as new traffic information. When a road link list of the link group is added to the link group's traffic information, the road link list is used to update the link group configuration information stored in the link group configuration information storage portion 515. The link group configuration information defines the link group and the corresponding information of the links that configure the link group.

The traffic information reproducing portion 514 reads the link group's traffic information stored in the traffic information storage portion 513 and reproduces traffic information of each link. When a road link list of the link group is not added to the link group's traffic information, a road link list of the link group is read from the link group configuration information storage portion 515 and traffic information of each link is reproduced.

The delivery request information transmitting portion 516 sends delivery request information to the traffic information providing apparatus 1 and requests the traffic information providing apparatus 1 for the delivery of latest traffic information. At this point, the delivery request information includes a mesh code for specifying an area and information for specifying a traffic information category (current traffic information, predicted traffic information, etc.). The information input portion 518 inputs information entered by using switches and buttons via the input/output interface 520. Furthermore, based on the traffic information stored in the traffic information storage portion 513 and map information, not shown, the traffic information display portion 519 creates a map about the vicinity of the position of own vehicle 6 and traffic information to be displayed. And, the display information is outputted to the display unit 52 via the input/output interface 520.

FIG. 2 is a flowchart showing the process of delivering traffic information by a traffic information providing apparatus 1 and an in-vehicle information apparatus 5 according to embodiment 1 of the present invention. Herein, provided traffic information is current traffic information, that is, the latest traffic information among the traffic information stored in the traffic information providing apparatus 1.

In FIG. 2, the information delivery process executed by the traffic information providing apparatus 1 starts by the in-vehicle information apparatus 5 transmitting a prescribed delivery request (S200). When an central processing unit of the computer that configures the traffic information providing apparatus 1 receives a traffic information providing request (S200) made by the in-vehicle information apparatus 5, the central processing unit analyzes which area's traffic information is requested based on the received request information (S210). Traffic information of all road links in the corresponding area is read from the traffic information DB (S211) and the road links' link travel time or travel speed are compared and then it is determined whether they are similar or not (S212). For example, links whose travel speed values are within a certain range are classified. It is possible to calculate a correlation coefficient of each link's traffic information and classify links according to links that have high correlation.

Figure 13:
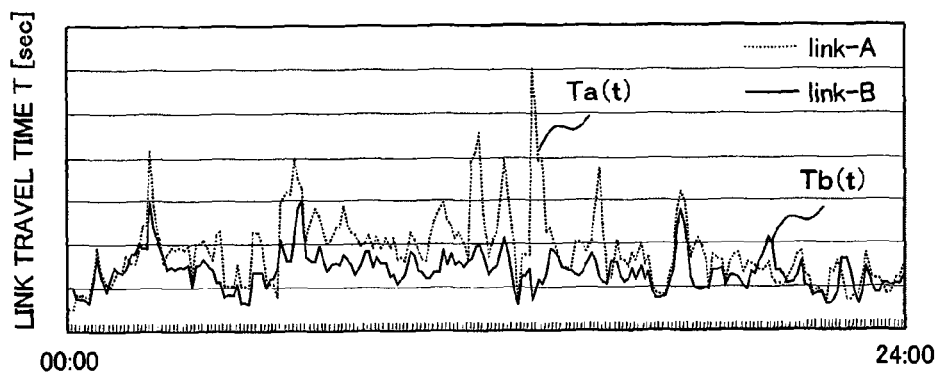
FIG. 13 is a time transition diagram of two link travel times used to explain a specific example of the present invention that determines the similarity of links according to correlation coefficients.

An example of the correlation coefficient will be explained with reference to FIG. 13. When similarity is determined according to the correlation coefficient, time shift of each link's speed and time shift of travel time are observed and the correlation coefficient is calculated. Then, links whose correlation coefficients are equal to or more than a prescribed value (for example, 0.5) are determined to be similar links. In FIG. 13, correlation coefficient r of the time shift of travel time of link A and link B is calculated by Equation (1).

[Equation 1]

$$\text{Correlation coefficient } r = \frac{\frac{1}{n-1} \sum_{t=1}^{n} (Ta(t) - \overline{Ta})(Tb(t) - \overline{Tb})}{\sqrt{\frac{1}{n-1} \sum_{t=1}^{n} (Ta(t) - \overline{Ta})^2} \sqrt{\frac{1}{n-1} \sum_{t=1}^{t} (Tb(t) - \overline{Tb})^2}} \quad (1)$$

For example, when correlation coefficient $r \geq 0.5$ is obtained, it is determined that link A and link B are similar. Equation (1) is a generally known Pearson product-moment correlation coefficient calculation formula.

Again, in FIG. 2, eventually, if there are similar road links, links that have been classified in a plurality of classes are formed into a link group for each class, and link group configuration information which shows a correspondence relation between the link group and links is created (S214). Although links that configure a link group are not limited to the links that have a relation of connection, operations are normally executed area by area (mesh by mesh); therefore, in this embodiment, links located in the same area (mesh) configure a link group. Representative values of the corresponding link group's travel speed, such as travel speed value used as a determination criterion to determine the classification of classes, an average value, or a center value of travel speed of the links that create the link group are calculated and specified (S215) as the link group's traffic information. Delivered traffic information data 300, which will be described later in this document with reference to FIG. 3, is created (S216) by using the specified link group's traffic information, and the traffic information is then delivered (S201) to the in-vehicle information apparatus 5 which made the request.

The in-vehicle information apparatus 5 acquires traffic information of the link group located in the requested area, and reproduces (S217) each road link's traffic information from the road link list added to the link group's traffic information based on the link group's traffic information. Furthermore, corresponding information (link group configuration information) of the link group and links stored in the link group configuration information storage portion 515 is updated (S218) by using the contents of the road link list mentioned above. Each link's reproduced traffic information is displayed (S219) on the screen, converted into audio output data to notify a driver, or used for the cost to calculate a route to the destination, or used for calculating the arrival time.

In this embodiment, similarity of individual road links is determined to create a link group. However, when considering actual traffic situations, geographical and environmental factors, such a road category indicating national roads or bypass roads, a road attribute indicating the width of road and the number of lanes, the straightness of a road, and relations between surrounding facilities and roads, significantly influence the similarity of the links. By prescribing the similarity of links by those geographical and environmental factors, it is possible to create a link group without using traffic information of road link. There is a method which switches operations according to the presence or absence of traffic information so that in areas and road links where traffic information cannot be acquired, link groups are created based on the above prescription, and in areas and road links where traffic information can be acquired, link groups are created by calculating the similarity of traffic information.

FIG. 3 shows an example of delivered traffic information data according to embodiment 1 of the present invention.

Hereafter, configuration of delivered data will be described with reference to FIG. 3. In this embodiment, a road link means a road that connects adjacent intersections, and a link travel speed means an average speed at which a vehicle moves along the link, that is, the road between intersections. Link travel time is estimated arrival time required to pass the link.

Delivered traffic information data 300 is a data format used in the traffic information delivery process S201 from the traffic information providing apparatus 1 to the in-vehicle information apparatus 5. The area code 310 specifies an area of a mesh code or predetermined prefectural number and normally sets a mesh code specified in the request information sent by the in-vehicle information apparatus 5. Provision time 320 is the time at which the traffic information was created, and it can be the information provision time set by the traffic information center 2 or the time set by the traffic information providing apparatus 1. The number of link groups 330 is a total number of link groups included in the delivered data. A link group 340 comprises a link group identification ID 341 for identifying the link group, the number of links 342 that configure the link group, the link group's traffic information 343, and a road link list 344 of the link group. In an example shown in FIG. 3, link group 1 comprises links L1, L2, L4, L100 and L101, and v1 represents a travel speed which is the link group's traffic information; and link group 2 comprises links L3, L205 and L206, and v2 represents a travel speed which is the link group's traffic information. Specifically, in the case of speed, traffic information is indicated by " km/h", in the case of link travel time, traffic information is indicated by " seconds (** is a numeric value)", and in the case of a degree of traffic jam, traffic information is indicated by an identification flag to represent normal traffic, busy traffic, or traffic jam.

Figure 4:
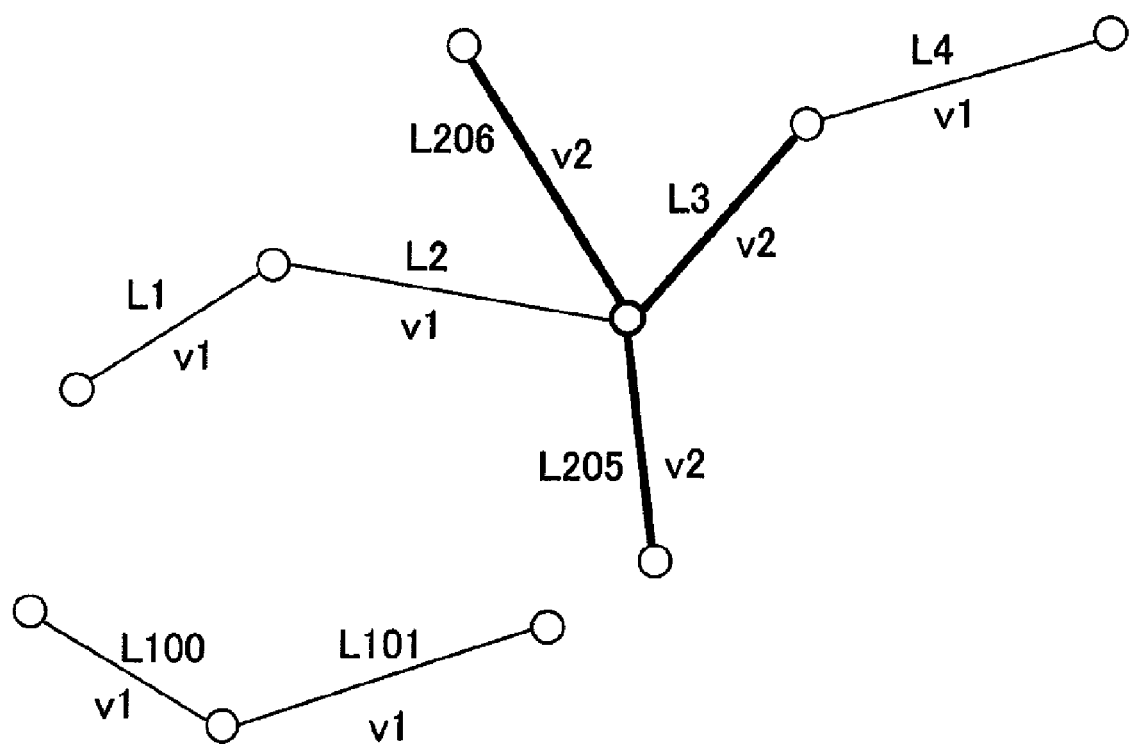
FIG. 4 is an imaginary drawing showing the geographical relations among individual road links in the corresponding area.

FIG. 4 is an imaginary drawing showing the geographical relations among individual road links in the corresponding area. Although travel speeds v1, v2 are used as an example of traffic information in FIG. 4, traffic information can be link travel time, a degree of traffic jam, or other traffic information as shown in FIG. 3. In this embodiment, as long as traffic information is similar, link groups are created regardless of the links' relations of connection. Herein, link groups are created according to the similarity of link travel speeds. However, it is possible to calculate correlativity between links' speed, travel time, or degree of traffic jam and create a link group of links that are highly correlated. Also, it is possible to set the link group's travel time (summation of link travel time that creates the link group) for the link group's traffic information 343. When the link group's travel time is set, the in-vehicle information apparatus 5 divides the link group's travel time by each link length ratio and reproduces each link's traffic information.

In embodiment 1, the amount of delivered traffic information data 300 can be reduced by including a road link list in the link group traffic information.

Furthermore, it is possible to further reduce the size of delivered data by using a link group and the link group configuration information stored in the link group configuration information storage portion 515. Hereafter, embodiment 2 which is thus extended will be described.

Embodiment 2

Figure 5:
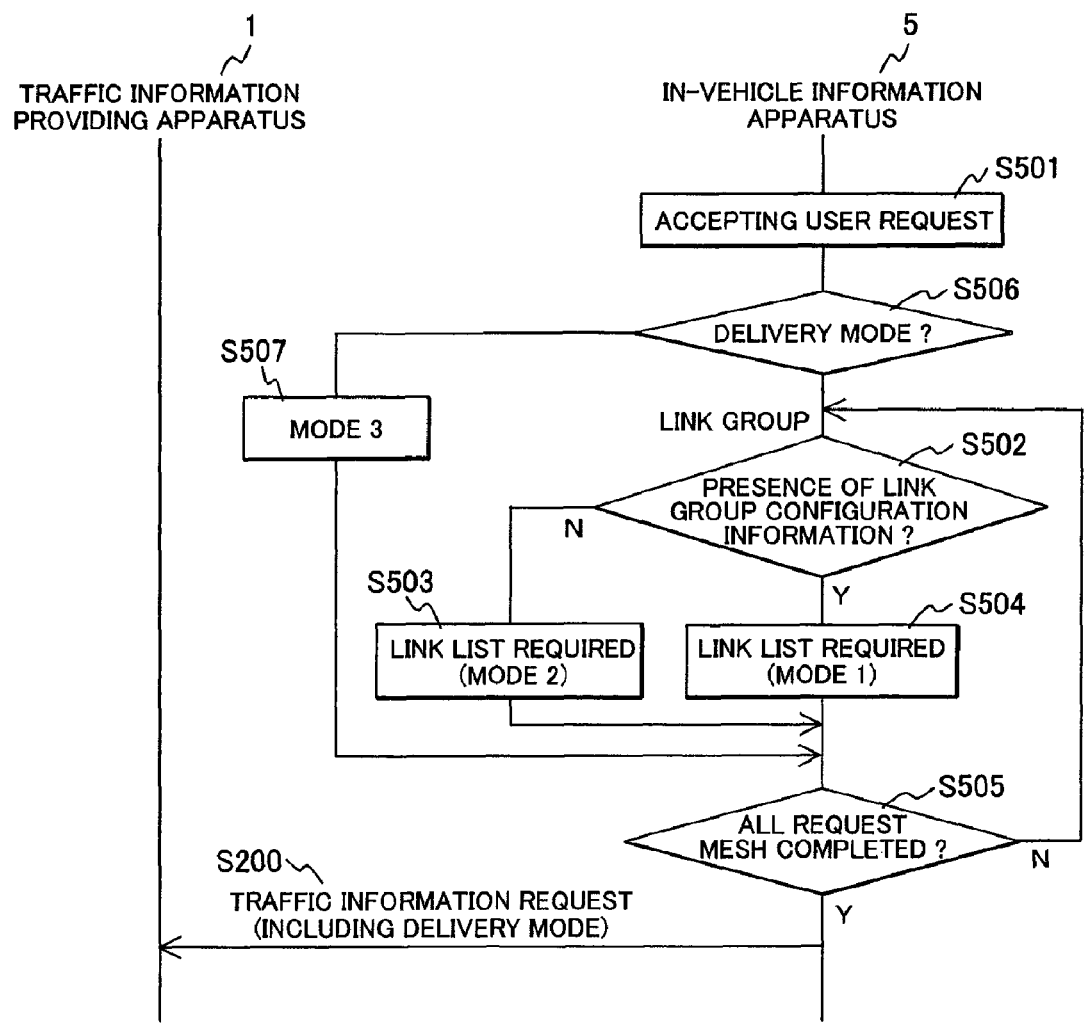
FIG. 5 is a flowchart showing the process of requesting the traffic information delivery by an in-vehicle information apparatus among the traffic information providing processes executed by a traffic information providing apparatus and an in-vehicle information apparatus according to embodiment 2 of the present invention.
Figure 6:
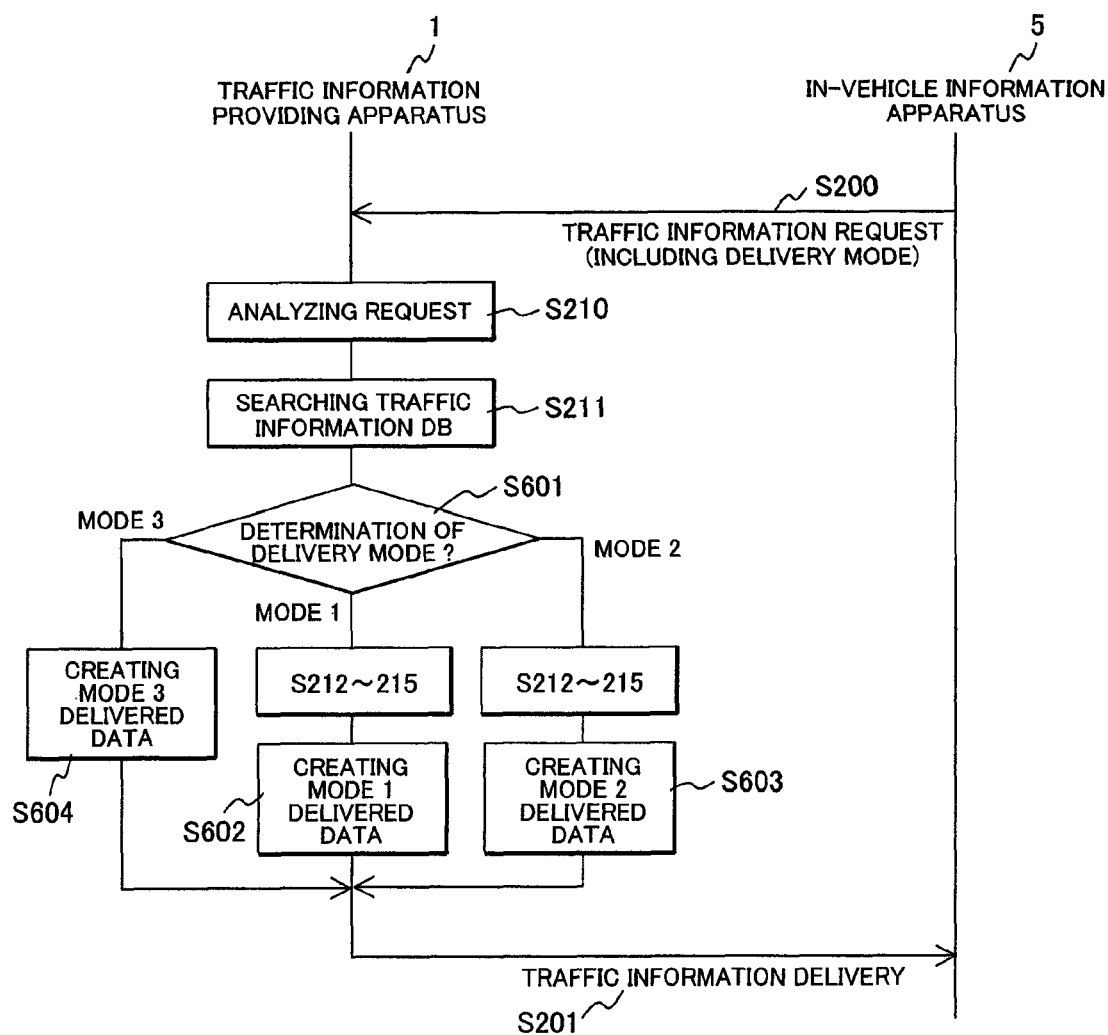
FIG. 6 is a flowchart showing the process of delivering traffic information in a traffic information providing apparatus among the traffic information providing processes executed by a traffic information providing apparatus and an in-vehicle information apparatus according to embodiment 2 of the present invention.

FIG. 5 and FIG. 6 are flowcharts showing the process of delivering traffic information in a traffic information providing apparatus 1 and an in-vehicle information apparatus 5 according to embodiment 2 of the present invention. FIG. 7 shows an extended configuration example of delivered traffic information data.

Hereafter, extension processing will be described with reference to FIG. 5 through FIG. 7.

The in-vehicle information apparatus 5 can specify either delivery mode 1 which does not include a road link list 344 (FIG. 3) in the link group traffic information or delivery mode 2 which includes a road link list 344 according to stored information. Furthermore, delivery mode 3 uses each road link's traffic information in a conventional method.

The in-vehicle information apparatus 5 checks whether link group configuration information of a specified area exists in the link group configuration information storage portion 515 (S502). If the area's link group configuration information exists, a road link list 344 (FIG. 3) is unnecessary, and the process proceeds to mode 1 (S504) which does not include the road link list 344. On the other hand, if the area's link group configuration information does not exist, a road link list 344 is necessary, and mode 2 (S503) which includes the road link list 344 is selected, and those indications are included in the traffic information request S200. Herein, even if link group configuration information exists in the in-vehicle information apparatus 5, if the information is older than the predetermined expiration period, mode 1 shall be specified.

FIG. 6 is a flowchart of operations executed by the traffic information providing apparatus 1 which has acquired a traffic information request S200, including a delivery mode, made by the in-vehicle information apparatus 5 as shown in FIG. 5. When a traffic information providing request S200 is received, traffic information that corresponds to the request conditions is read from the traffic information DB. When link group traffic information including a road link list (mode 2) is specified by using the delivery mode included in the request information as a condition (S601), mode 2 delivered data is created (S603). When link group traffic information that does not include a road link list (mode 1), mode 1 delivered data is created (S602).

FIG. 7 shows delivered traffic information data 701, 702 according to the embodiment 2 of the present invention. Delivered traffic information data in delivery mode 1 comprises units of data 701 of FIG. 7(A) and delivered traffic information data in delivery mode 2 comprises units of data 702 of FIG. 7(B). Delivered traffic information data is a delivered data format wherein a delivery mode 710 or 720 is added to the delivered traffic information data 300 of FIG. 3 described above so that delivered data can be created based on either mode 1 or 2. When mode 1 is set for delivery mode 710, traffic information 343 is added to the link group ID 341. At this point in time, the number of links 342 and the road link list 344 do not exist. In mode 2, delivery mode 720 is added to the delivered data described in FIG. 3, and delivered data comprises units of data 310, 320, 720, 330, 341-344.

Another characteristic of the traffic information providing apparatus according to embodiment 2 is to deliver information by combining a plurality of delivery modes. This will be explained with reference to FIG. 8.

Figure 8:
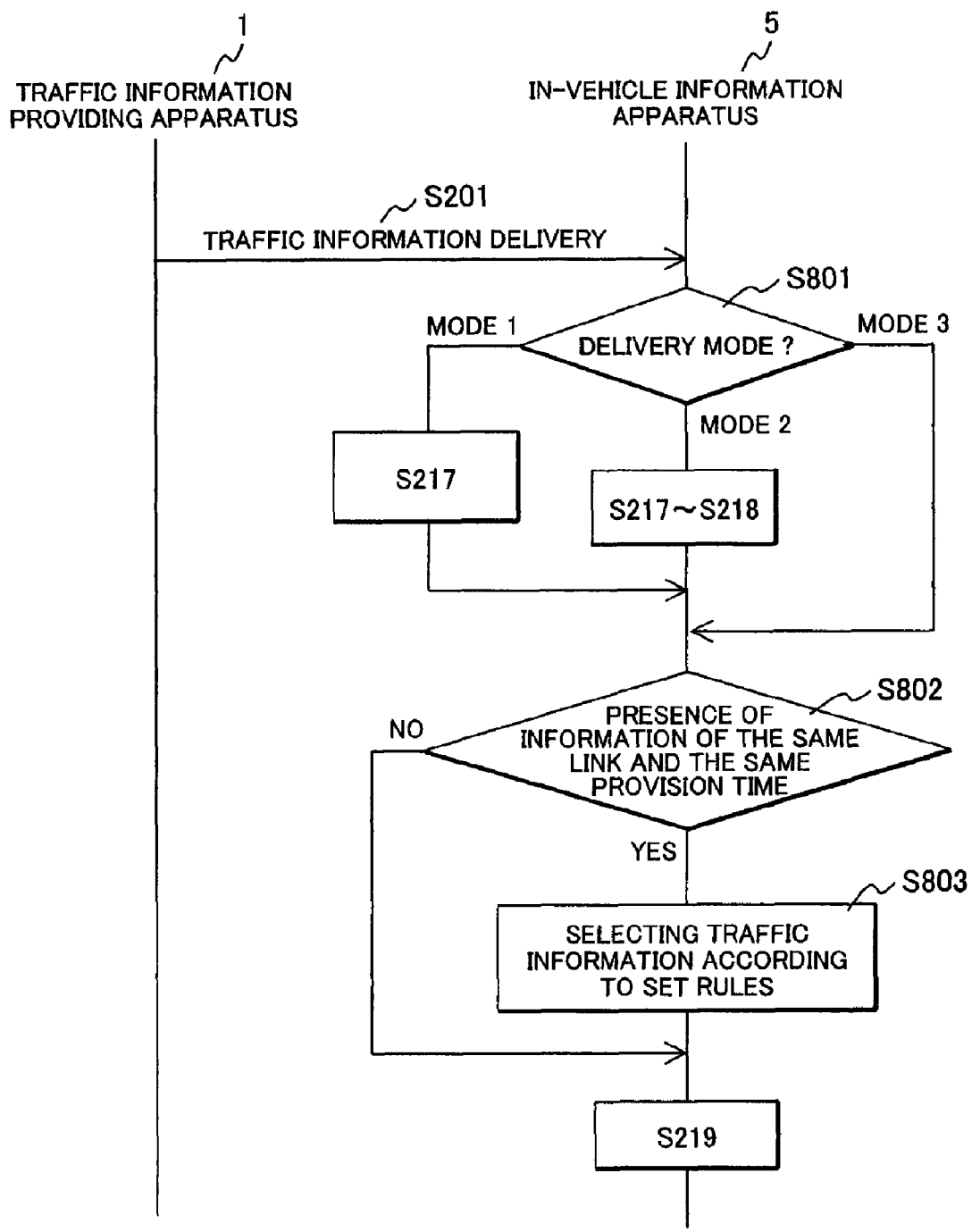
FIG. 8 is a flowchart showing the operation executed by an in-vehicle information apparatus when it receives a plurality of delivery modes according to embodiment 2 of the present invention.

FIG. 8 is a flowchart showing the operation executed by an in-vehicle information apparatus 5 when it receives a plurality of delivery modes according to embodiment 2 of the present invention.

When mode 1 data is acquired in data delivery mode determination step S801, based on the correspondence relation between the link group configuration information of the link group configuration information storage portion 515 and the received link group traffic information, traffic information of each link which configures the link group is reproduced (S217). When mode 2 data is acquired, based on the received link group traffic information and an included road link list, traffic information of each link which configures the link group is reproduced (S217), and the link group configuration information storage portion 515 is updated by using the road link list (S218). Since data acquired in mode 3 is traffic information of each road link as in the conventional method, it is not necessary to reproduce traffic-information and reproduction is not executed.

Next, verification is made whether the same link with the same provision time exists or not in a plurality of modes (S802), and if the link exists, either traffic information is to be selected according to a predetermined rule (S803). For example, the rule can be determined as described below.

When the traffic information providing apparatus 1 creates delivered traffic information data 701 or 702, there is a possibility that a different link (one that deviates from an allowable range) (hereafter, referred to as a peculiar link) may exist in the links that configure a link group. That is, it is not necessary to send a peculiar link when a link group is dynamically defined; however, when a link group is not dynamically defined, the peculiar link is to be sent in mode 3.

In embodiment 2, a link group is statically set; that is, a link group is preliminarily set according to any one of the correlativity of speed (travel time), road category, and road attribute, and traffic information is provided by using the preliminarily set link groups. In this case, there is a possibility that a link deviated from an allowable range (=peculiar link) may be included in the link group. Since the peculiar link causes some problems in that a route quality error and an estimated arrival time error increase, traffic information in this embodiment is provided in a plurality of modes. Thus, delivered data which includes the peculiar link's traffic information in delivery mode 3 is to be provided.

The in-vehicle information apparatus 5, which has received the delivered data, expands the link group's traffic information to the links' when reproducing the link's traffic information, and then by replacing the peculiar link's traffic information with information acquired in mode 3, it is possible to display the peculiar link's traffic information on the terminal.

As stated above, it is an advantage of setting a plurality of delivery modes that the reliability of delivered data can be maintained even if a peculiar road link whose similarity has been eliminated due to data change over time or temporary circumstances is included in a link group. That is, link group configuration information is dynamically updated and can be supplemented by providing traffic information of a link that combines with mode 3. Therefore, if link group configuration information is properly updated, a peculiar link will not frequently appear. Therefore, even if delivered data is configured by including mode 3, the reduction effect of the amount of delivered data in the link group traffic information delivery process in this embodiment is not greatly influenced. Next, the delivery process that combines a delivery mode will be specifically described with reference to FIG. 9 and FIG. 10.

FIG. 9 is an example showing the configuration of delivered traffic information data 900 combined with delivery modes according to embodiment 2 of the present invention. FIG. 10 relates to FIG. 9 and shows an example of link group configuration information 100 which shows the configuration of the link group set for the delivered traffic information data 900. Link group configuration information 100 is stored in the link group configuration information storage portion 515.

Delivered traffic information data 900 is configured by combining mode 1 information and mode 3 information. Traffic information of link group 1 and link group 2 is set for mode 1, and traffic information of link L2 is set for mode 3. According to a link group's configuration information 100, link group 1 comprises links L1, L2, L4, L100, and L101, and link group 2 comprises links L3, L205 and L206. This corresponds to FIG. 4. Due to this, traffic information of links L1, L2, L4, L100 and L101 is set as speed v1, and traffic information of links L3, L205 and L206 is set as speed v2. As shown at the lower part of FIG. 9, link L2 set in mode 3 is a peculiar link. Therefore, traffic information v1 of link L2 acquired in mode 1 is updated to traffic information v3 acquired in mode 3.

Figure 11:
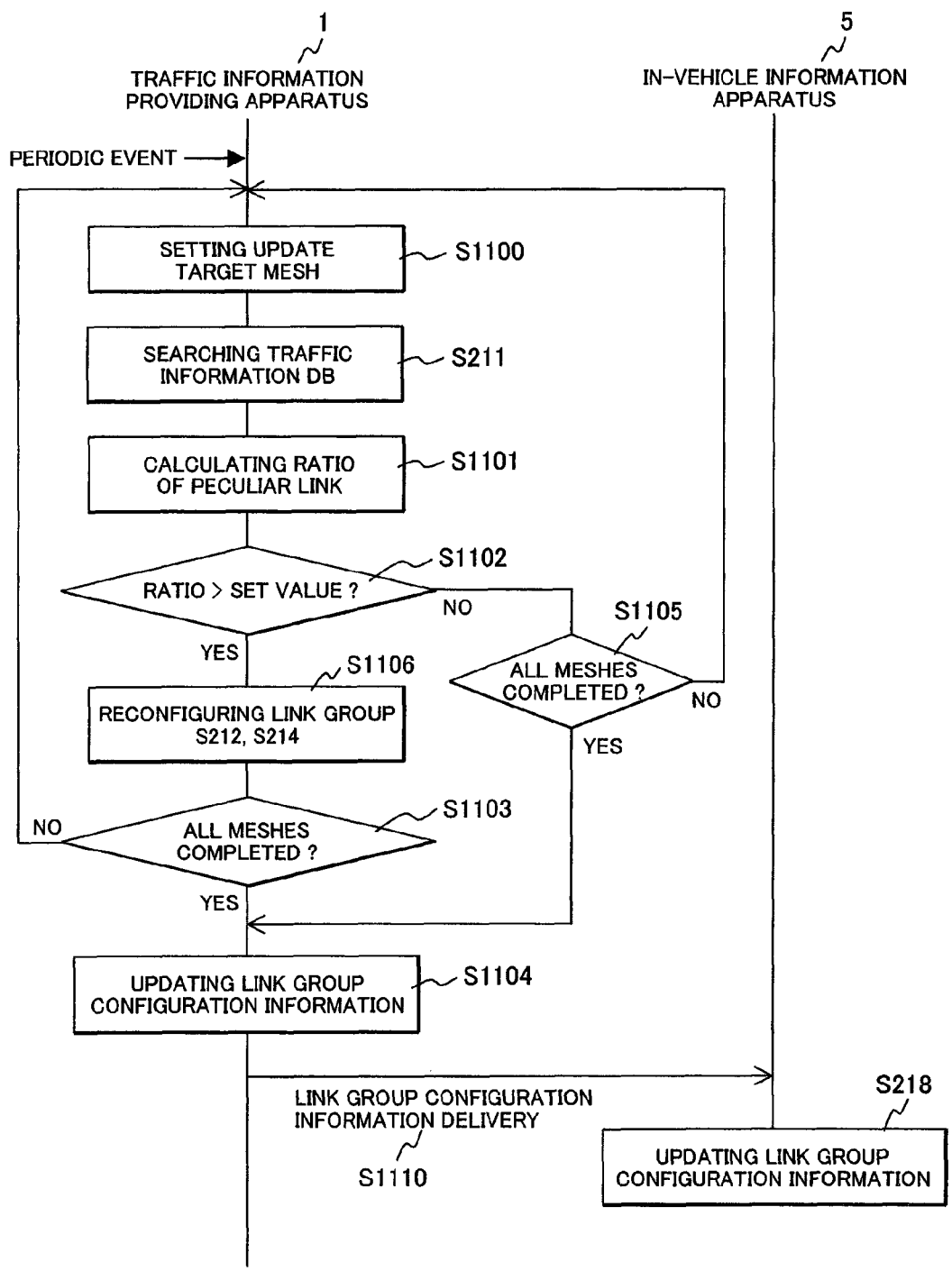
FIG. 11 is a flowchart showing the process of updating link group configuration information in a traffic information providing apparatus and an in-vehicle information apparatus according to embodiment 2 of the present invention.

FIG. 11 is a flowchart showing the process of updating link group configuration information in a traffic information providing apparatus 1 and an in-vehicle information apparatus 5 according to embodiment 2 of the present invention. Link group configuration information 100 (FIG. 10) is updated (S218) when the in-vehicle information apparatus 5 has acquired link group traffic information (mode 2 including a road link list). Besides, as shown in this flowchart, there is a possible method by which data is periodically updated by the traffic information providing apparatus 1 and sent to the in-vehicle information apparatus 5.

The traffic information providing apparatus 1 updates link group configuration information which indicates a correspondence relation between the link group and links at a predetermined time period or at the timing when latest traffic information is acquired from the traffic information center 2. Herein, it is assumed that the link group configuration information is stored in the traffic information DB 13 (FIG. 1). A link group is periodically reconfigured in steps S212 and S214 (FIG. 2), link group configuration information stored in the traffic information DB 13 is updated (S1104) by using the reconfigured link group, and the updated link group configuration information is delivered (S110) to the in-vehicle information apparatus 5.

The update target is information about all road links in nation-wide which have been registered in the traffic information DB. Therefore, when there is a problem with the load related to update operation, the ratio of the presence of a peculiar link is beforehand calculated (S1101) for each mesh, and when the ratio exceeds (S1102) a predetermined set value, the link group of the mesh is updated. Thus, the link group update processing load is to be reduced. Necessity of update is verified for all meshes, and a link group of the necessary mesh is reconfigured (S1103), and then, link configuration information of the updated mesh is sent (S1110) to the in-vehicle information apparatus 5, and the process is completed.

When acquiring the updated link group configuration information, the in-vehicle information apparatus 5 updates the link group configuration information stored in the link group configuration information storage means 515 by using the acquired link group configuration information.

Herein, the in-vehicle information apparatus 5 is normally operated by activating a vehicle engine during traveling; it is not in operation all the time. Therefore, it is desirable that link configuration information be sent (S1110) according to a request made by the in-vehicle information apparatus 5.

Figure 12:
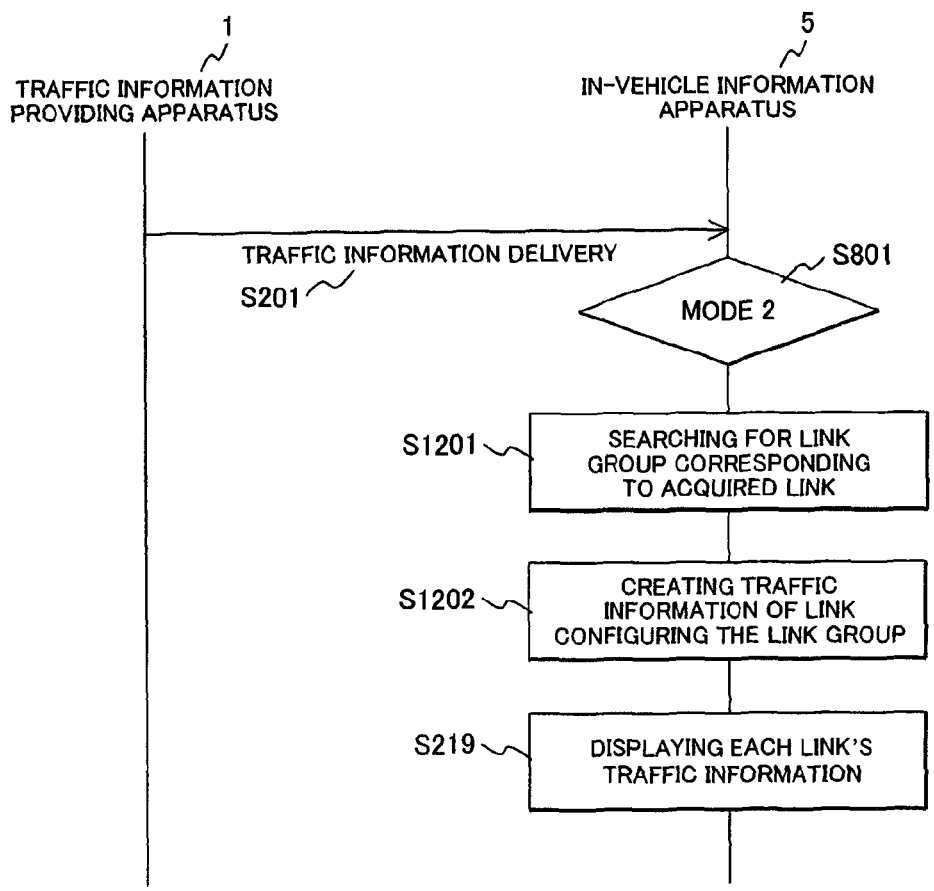
FIG. 12 is a flowchart of the following process: when a single link's traffic information according to embodiment 2 of the present invention is acquired, based on the link's traffic information and the link group configuration information, traffic information of links other than the above-mentioned link is estimated and supplemented.

FIG. 12 is a flowchart of the following process: in a traffic information providing apparatus 1 and an in-vehicle information apparatus 5 according to embodiment 2 of the present invention, when a single link's traffic information is acquired in mode 3 from the traffic information providing apparatus 1, based on the link's traffic information and the link group configuration information, traffic information of links other than the above-mentioned link is estimated and supplemented.

When receiving a single link's traffic information in mode 3, the in-vehicle information apparatus 5 searches (S1201) the link group configuration information storage means 515 for a link group that contains the corresponding link. Traffic information of the acquired link is specified for traffic information of the link that configures the corresponding link group. The link group configuration information storage means 515 is link group configuration information wherein similar links are formed into a link group. Therefore, by using this information, even if traffic information of only a portion of the links can be acquired from a traffic information providing center 1, it is possible for the in-vehicle information apparatus 5 to independently supplement for the links' traffic information. The same situation can be applied not only to current traffic information but also predicted traffic information. It is possible to supplement for predicted information PL(i+n)(t) of the link L(i+n) which configures the link group that includes the corresponding link by using predicted information PLi(t)(t: time to predict) of the acquired link Li.

INDUSTRIAL APPLICABILITY

The present invention can be used to improve the delivery function of traffic information provided by the traffic information service, and it is possible to provide traffic information which reduces communication costs while enhancing provided information for car navigation apparatuses, cellular phones, PDAs, and PCs.

What is claimed is:

1. A traffic information providing system, comprising:
   a traffic information providing apparatus which delivers collected road traffic information to a communication network;
   an in-vehicle information apparatus which is installed in a vehicle, and receives road traffic information delivered to said communication network;
   a transmitter, which is disposed in said traffic information providing apparatus, and transmits, via said communication network, (i) a defined link group from a plurality of link groups that includes at least one of a first link group comprising a plurality of road links which are similar to each other with regard to traffic information, and a second link group comprising a plurality of road links which are similar to each other with regard to geographic and environmental information, (ii) traffic information corresponding to said transmitted link group; and
   a delivery unit that compares said traffic information of each road link of said first link group and, when there is an aberrant road link whose difference exceeds an expected value, said delivery unit delivers traffic information that corresponds to the aberrant road link.

2. The traffic information providing system according to claim 1, further comprising:
   a similarity determination unit, which determines similarity of said traffic or geographic and environmental information of said plurality of road links; and
   a link group collector which creates said first link group by collecting said plurality of road links that the similarity determination unit has determined to be similar.

3. The traffic information providing system according to claim 1, further comprising:
   a link group collector that creates said link groups by collecting a plurality of said road links whose traffic or geographic and environmental information difference is within a predetermined range.

4. The traffic information providing system according to claim 1, further comprising a similarity determination unit that compares information including travel time, travel speed, degree of traffic jam, length of traffic jam, or traffic jam location along the road links and determines similarity of said plurality of road links.

5. The traffic information providing system according to claim 1, further comprising an identification code assigning unit that assigns an identification code to the respective link groups; wherein said traffic information providing apparatus delivers traffic information that corresponds to said identification code.

6. The traffic information providing system according to claim 1, further comprising:
   a link group configuration information creating unit that defines a correspondence relation between said link groups and individual road links that configure said link groups;
   wherein said delivery unit also delivers said link group configuration information.

7. The traffic information providing system according to claim 1, further comprising a link group update unit that compares traffic information regarding links of said link groups, detects presence of an aberrant link whose difference exceeds an expected value, and, when the number of such aberrant links in a particular link group exceeds a prescribed quantity, reconfigures the particular link group.

8. The traffic information providing system according to claim 1, further comprising a memory that stores link group configuration information that defines a correspondence relation among individual road links that configure said link group, wherein said traffic information providing apparatus delivers said traffic information corresponding to the link group, and said link group configuration information.

9. The traffic information providing system according to claim 1, further comprising:
   a memory for storing link group configuration information that defines a correspondence relation among individual road links that configure respective link groups;
   wherein said traffic information providing apparatus has a first delivery mode for delivering said traffic information for a link group without corresponding link group configuration information, and a second delivery mode for delivering said traffic information for the link group, together with said link group configuration information.

10. The traffic information providing system according to claim 1, wherein said traffic information providing apparatus has a delivery mode for delivering said traffic information for a link group, and a further delivery mode for delivering said traffic information corresponding to an individual road link.

11. The traffic information providing system according to claim 1, further comprising:
   a memory for storing link group configuration information that defines a correspondence relation among individual road links that configure a link group; wherein, said traffic information providing apparatus has one delivery mode for delivering said traffic information corresponding to a link group together with said link group configuration information, and another delivery mode for delivering said traffic information corresponding to an individual road link.

12. The traffic information providing system according to claim 1, wherein
   said in-vehicle information apparatus has a link group configuration information storage unit; and
   when traffic information corresponding to a link group is received from said communication network, link group configuration information stored in said link group configuration information storage unit is updated.

13. The traffic information providing system according to claim 1, wherein said in-vehicle information apparatus has a delivery request transmitter that sends a request for the delivery of said traffic information to said traffic information providing apparatus via said communication network.

14. The traffic information providing system according to claim 1, wherein:
   said traffic information providing apparatus has a plurality of delivery modes to deliver said traffic information; and
   said in-vehicle information apparatus has a delivery request transmitter that sends a request for the delivery of said traffic information to said traffic information providing apparatus via said communication network, which request specifies one of said delivery modes.

15. The traffic information providing system according to claim 1, wherein
   said traffic information providing apparatus comprises,
   a unit that creates link group configuration information that defines a correspondence relation between said link group and individual road links that configure said link group; and
   a delivery unit for adding said link group configuration information to traffic information of said corresponding link group and delivering the information; and
   said in-vehicle information apparatus has a unit that sends a request for the delivery of said traffic information to said traffic information providing apparatus via said communication network by specifying the necessity or unnecessity of said link group configuration information.

16. The traffic information providing system according to claim 1, wherein said in-vehicle information apparatus comprises:
   a link group configuration information storage unit; and
   a delivery request collector that creates a delivery request that includes information about an area whose traffic information is to be acquired, and information for specifying the necessity or lack of necessity of link group configuration information according to the presence or absence of the storage of said link group configuration information of each corresponding area.

* * * * *